United States Patent
Park et al.

(10) Patent No.: US 11,359,144 B2
(45) Date of Patent: Jun. 14, 2022

(54) LIQUID CRYSTAL ALIGNING AGENT COMPOSITION, METHOD FOR PREPARING LIQUID CRYSTAL ALIGNMENT FILM USING SAME, ALIGNMENT FILM, AND LIQUID CRYSTAL DISPLAY DEVICE USING SAME

(71) Applicant: LG CHEM, LTD., Seoul (KR)

(72) Inventors: Hang Ah Park, Daejeon (KR); Jung Ho Jo, Daejeon (KR); Jun Young Yoon, Daejeon (KR); Hyeong Seuk Yun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 430 days.

(21) Appl. No.: 16/610,698

(22) PCT Filed: Nov. 1, 2018

(86) PCT No.: PCT/KR2018/013199
§ 371 (c)(1),
(2) Date: Nov. 4, 2019

(87) PCT Pub. No.: WO2019/088739
PCT Pub. Date: May 9, 2019

(65) Prior Publication Data
US 2021/0155853 A1 May 27, 2021

(30) Foreign Application Priority Data

Nov. 3, 2017 (KR) .................. 10-2017-0146284
Oct. 30, 2018 (KR) .................. 10-2018-0131273

(51) Int. Cl.

| | |
|---|---|
| *C08F 2/46* | (2006.01) |
| *C08F 2/50* | (2006.01) |
| *C08G 61/04* | (2006.01) |
| *C09K 19/56* | (2006.01) |
| *C08L 63/00* | (2006.01) |
| *C08L 79/02* | (2006.01) |
| *C08L 79/08* | (2006.01) |
| *C09D 179/08* | (2006.01) |
| *G02F 1/1337* | (2006.01) |

(52) U.S. Cl.
CPC ............. *C09K 19/56* (2013.01); *C08L 63/00* (2013.01); *C08L 79/02* (2013.01); *C08L 79/08* (2013.01); *C09D 179/08* (2013.01); *G02F 1/133723* (2013.01); *G02F 1/133788* (2013.01); *C08L 2205/03* (2013.01)

(58) Field of Classification Search
CPC .. C08G 73/0233; C08G 59/24; C08G 73/105; C08G 73/1078; C08G 73/1071; G02F 1/133723; G02F 1/1337; G02F 1/133788; C09D 179/08; C08K 19/52; C08K 19/54; C08K 19/56; C08L 79/08; C08L 79/02; C08L 63/00; C08L 2205/03
USPC ........................................ 522/111, 1; 520/1
See application file for complete search history.

(56) References Cited

U.S. PATENT DOCUMENTS

| | | | |
|---|---|---|---|
| 3,476,712 | A | 11/1969 | Fukui et al. |
| 5,756,650 | A | 5/1998 | Kawamonzen et al. |
| 6,465,582 | B1 | 10/2002 | Higginbottom et al. |
| 9,771,519 | B2 | 9/2017 | Katano et al. |
| 2005/0103224 | A1 | 5/2005 | Patel |
| 2009/0214823 | A1 | 8/2009 | Cheng et al. |
| 2012/0172541 | A1 | 7/2012 | Dong et al. |
| 2017/0242189 | A1 | 8/2017 | Yokoyama et al. |

FOREIGN PATENT DOCUMENTS

| | | |
|---|---|---|
| EP | 2856858 A1 | 4/2015 |
| EP | 3054326 A1 | 8/2016 |
| FR | 1497709 A | 10/1967 |
| JP | 2008-015497 A | 1/2008 |
| JP | 2016-118574 A | 6/2016 |
| JP | 2016-200798 A | 12/2016 |
| KR | 10-0234814 B1 | 12/1999 |
| KR | 10-2008-0020951 A | 3/2008 |
| KR | 10-2012-0022633 A | 3/2012 |
| KR | 10-2015-0118527 A | 10/2015 |
| KR | 10-2016-0095801 A | 8/2016 |
| KR | 10-2016-0146520 A | 12/2016 |
| TW | 201247780 A | 12/2012 |
| TW | 201620958 A | 6/2016 |
| WO | 2016-035823 A1 | 3/2016 |

OTHER PUBLICATIONS

Search Report & Written Opinion issued for PCT Application No. PCT/KR2018/013199 dated Feb. 8, 2019, 11 pages.
Christova, et al., "New thermo-responsive polymer materials based on poly(2-ethyl-2-oxazoline) segments," Polymer, 2003, vol. 44, pp. 2255-2261.
Sun, et al., "Conformational changes in the heat-induced crystallization of poly(2-isopropyl-2-oxazoline) in the solid state," Phys., Chem., Chem., Phys., 2015, vol. 17, pp. 31084-31092.
Search Report issued for European Patent Application No. 18874352.0 dated May 25, 2020, 14 pages.
Chao Su et al., Hydrogen-Bonded Polymer Complex Thin Film of Poly (2-oxazoline) and Poly (acrylic acid), Polymers, vol. 9, 363, pp. 1-15 (2017).

*Primary Examiner* — Jessica Whiteley
(74) *Attorney, Agent, or Firm* — Rothwell, Figg, Ernst & Manbeck, P.C.

(57) ABSTRACT

A liquid crystal aligning agent composition for forming a liquid crystal alignment film having improved electrical characteristics and high reliability while exhibiting excellent alignment properties and durability, a method for preparing a liquid crystal alignment film using the same, and a liquid crystal alignment film and a liquid crystal display device using the liquid crystal alignment film.

20 Claims, No Drawings

LIQUID CRYSTAL ALIGNING AGENT COMPOSITION, METHOD FOR PREPARING LIQUID CRYSTAL ALIGNMENT FILM USING SAME, ALIGNMENT FILM, AND LIQUID CRYSTAL DISPLAY DEVICE USING SAME

CROSS-REFERENCE TO RELATED APPLICATION(S)

This application is a 35 U.S.C. 371 National Phase Entry Application from PCT/KR2018/013199, filed on Nov. 1, 2018, which claims the benefits of filing dates of Korean Patent Application No. 10-2017-0146284 filed with Korean Intellectual Property Office on Nov. 3, 2017, and Korean Patent Application No. 10-2018-0131273 filed with Korean Intellectual Property Office on Oct. 30, 2018, the entire contents of which are incorporated herein by reference.

TECHNICAL FIELD

The present invention relates to a liquid crystal aligning agent composition for forming a liquid crystal alignment film having improved film strength and reliability while exhibiting excellent alignment properties and electrical characteristics, a method for preparing a liquid crystal alignment film using the same, and a liquid crystal alignment film and a liquid crystal display device using the same.

BACKGROUND ART

In a liquid crystal display device, a liquid crystal alignment film plays a role of aligning liquid crystals in a predetermined direction. Specifically, a liquid crystal alignment film acts as a director for the arrangement of liquid crystal molecules, and thus, when the liquid crystals move due to an electric field to form an image, it allows the liquid crystals to align in an appropriate direction. In general, in order to obtain uniform brightness and a high contrast ratio in a liquid crystal display device, it is essential to uniformly align liquid crystals.

As a conventional method of aligning liquid crystals, a rubbing method of coating a polymer film such as a polyimide onto a substrate such as glass or the like and rubbing a surface thereof using fibers such as nylon or polyester in a predetermined direction has been used. However, the rubbing method may cause serious problems during the manufacturing process of the liquid crystal panel because fine dust or electrostatic discharge (ESD) occurs when the fiber and polymer film are rubbed.

In order to solve the problems of the rubbing method, a photoalignment method for inducing anisotropy in a polymer film by light irradiation rather than the rubbing, and aligning liquid crystals using anisotropy, has been recently studied.

As materials that can be used for the photoalignment method, various materials have been introduced, among which a polyimide is mainly used for variously producing superior performance of a liquid crystal alignment film. However, the polyimide is usually poor in solubility in a solvent, so it is difficult to apply it directly to a manufacturing process of coating it in a solution state to form an alignment film. Accordingly, after coating in the form of a precursor such as a polyamic acid or a polyamic acid ester having excellent solubility, a high-temperature heat treatment process is performed to form a polyimide, which is then subjected to light irradiation to perform alignment treatment. However, in order to obtain sufficient liquid crystal alignment properties by subjecting the film in the form of polyimide to light irradiation, a large amount of energy is necessary and thus it is difficult to secure substantial productivity, and additionally, there is a limitation in that an additional heat treatment process is required for securing alignment stability after the light irradiation.

In addition, in the case of a photoalignment film for a conventional horizontally aligned liquid crystal display device, an afterimage characteristic is the most serious problems. In order to solve these problems, a method of improving the liquid crystal alignment property of an alignment film through inducing the anisotropy of the polymer chains has been used. However, even a photoalignment film having the above characteristics should exhibit a high voltage holding ratio (VHR) for driving a liquid crystal display device at a high level, but with polyimide alone, there is a limitation in achieving these properties. Therefore, there is a need for an alignment film capable of exhibiting excellent alignment properties and showing a high voltage holding ratio which is maintained for a long period of time (reliability according to the driving time).

DETAILED DESCRIPTION OF THE INVENTION

Technical Solution

The present invention provides a liquid crystal aligning agent composition for forming a liquid crystal alignment film having improved electrical characteristics and high reliability while exhibiting excellent alignment properties and durability.

The present invention also provides a method for preparing a liquid crystal alignment film using the above-described liquid crystal aligning agent composition.

The present invention further provides a liquid crystal alignment film prepared by the above-described preparation method, and a liquid crystal display device including the same.

The present invention provides a liquid crystal aligning agent composition including: (i) a polymer containing polyimide or a precursor thereof; and (ii) a polyoxazoline crosslinking agent containing a repeating unit represented by the following Chemical Formula 1.

[Chemical Formula 1]

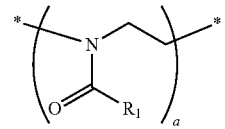

In Chemical Formula 1, $R_1$ is an alkyl group having 1 to 20 carbon atoms, or a heteroatom-substituted alkyl group having 1 to 20 carbon atoms, and a is an integer of 1 to 10,000.

When an existing polyimide is used as a liquid crystal alignment film, a polyimide precursor, such as a polyamic acid or a polyamic acid ester having excellent solubility, is coated and dried to form a coating film, which is then converted into a polyimide through a high-temperature heat treatment process, and subjected to light irradiation or rubbing treatment to perform alignment treatment.

However, in the case of such a polyimide alignment film, the electrical characteristics are weakened due to polyamic acid remaining in the alignment film, and there is a limitation in that the strength of the alignment film is not sufficient because there is no crosslinking between the repeating units except for the bonding between the repeating units forming the polyimide main chain.

In this regard, the present inventors found through experiments that when a polyoxazoline crosslinking agent is applied as a crosslinking agent that is capable of forming a cross-linked structure between internal repeating units with respect to a polyamic acid or a polyamic acid ester corresponding to a polyimide precursor, the electrical characteristics of the alignment film are improved through an intermolecular bond (hydrogen bond) between the terminal carboxyl group of the polyamic acid and the amide group in the polyoxazoline crosslinking agent, and simultaneously excellent mechanical strength can be secured through formation of a cross-linked material. The present invention has been completed on the basis of such findings.

In addition, it has been found that since the carboxyl group present in the polyamic acid forms an intermolecular bond (hydrogen bond) between the carboxyl group and the amide groups in the polyoxazoline crosslinking agent, hydrolysis of the polymer in the alignment film is suppressed, and the possibility of inducing afterimages is low as compared with existing liquid crystal alignment films, thereby preparing a liquid crystal alignment film having high reliability.

Specifically, in the case of the polyoxazoline crosslinking agent which is added to the liquid crystal aligning agent composition, an effective intermolecular reaction with the carboxy group present in the polyamic acid can be induced through a multifunctional chemical structure containing two or more amide functional groups in the molecule.

This allows the polyoxazoline crosslinking agent to mediate crosslinking between the internal main chains of the polyamic acid or the polyamic acid ester. By forming a crosslinked structure having a relatively high degree of crosslinking, it can have remarkably improved mechanical strength as compared with existing liquid crystal alignment films.

Hereinafter, the present invention will be described in more detail.

Definition of Terms

Unless specified otherwise herein, the following terms can be defined as follows.

Throughout the specification, when one part "includes" one constituent element, unless otherwise specifically described, this does not mean that another constituent element is excluded, but means that another constituent element may be further included.

As used herein, the term "substituted" means that another functional group is bonded in place of a hydrogen atom in the compound, and a position to be substituted is not limited as long as the position is a position at which the hydrogen atom is substituted, that is, a position at which the substituent can be substituted, and when two or more are substituted, the two or more substituents may be the same as or different from each other.

As used herein, the term "substituted or unsubstituted" means being unsubstituted or substituted with one or more substituents selected from the group consisting of deuterium; a halogen group; a cyano group; a nitro group; a hydroxyl group; a carbonyl group; an ester group; an imide group; an amide group; an amino group; a carboxy group; a sulfonic acid group; a sulfonamide group; a phosphine oxide group; an alkoxy group; an aryloxy group; an alkylthioxy group; an arylthioxy group; an alkylsulfoxy group; an arylsulfoxy group; a silyl group; a thiol group; a boron group; an alkyl group; a cycloalkyl group; an alkenyl group; an aryl group; an aralkyl group; an aralkenyl group; an alkylaryl group; an arylphosphine group; or a heterocyclic group containing at least one of N, O, and S atoms, or being unsubstituted or substituted with a substituent to which two or more substituents are linked among the substituents exemplified above. For example, "the substituent to which two or more substituents are linked" may be a biphenyl group. That is, the biphenyl group may also be an aryl group, and may be interpreted as a substituent to which two phenyl groups are linked.

As used herein, the notation $\frac{1}{2}$ or $-\!-\!-\!*$ means a bond linked to another substituent group, and the direct bond means the case in which no separate atom is present at a part represented by L.

The hydrocarbon having 4 to 20 carbon atoms may be an alkane having 4 to 20 carbon atoms, an alkene having 4 to 20 carbon atoms, an alkyne having 4 to 20 carbon atoms, a cycloalkane having 4 to 20 carbon atoms, a cycloalkene having 4 to 20 carbon atoms, an arene having 6 to 20 carbon atoms, or a fused ring in which one or more of the cyclic hydrocarbons share two or more atoms, or a hydrocarbon in which one or more of the hydrocarbons are chemically linked to each other. Specifically, the hydrocarbon having 4 to 20 carbon atoms may be exemplified by N-butane, cyclobutane, 1-methylcyclobutane, 1,3-dimethylcyclobutane, 1,2,3,4-tetramethylcyclobutane, cyclopentane, cyclohexane, cycloheptane, cyclooctane, cyclohexene, 1-methyl-3-ethylcyclohexene, bicyclohexyl, benzene, biphenyl, diphenylmethane, 2,2-diphenylpropane, 1-ethyl-1,2,3,4-tetrahydronaphthalene, 1,6-diphenylhexane, or the like.

The alkyl group having 1 to 20 carbon atoms may be a straight-chain, branched, or cyclic alkyl group. Specifically, the alkyl group having 1 to 20 carbon atoms may be a straight-chain alkyl group having 1 to 10 carbon atoms; a straight-chain alkyl group having 1 to 6 carbon atoms; a branched or cyclic alkyl group having 3 to 10 carbon atoms; or a branched or cyclic alkyl group having 3 to 6 carbon atoms. More specifically, the alkyl group having 1 to 10 carbon atoms may be exemplified by a methyl group, an ethyl group, an N-propyl group, an iso-propyl group, an N-butyl group, an iso-butyl group, a tert-butyl group, an N-pentyl group, an iso-pentyl group, a neo-pentyl group, a cyclohexyl group, or the like.

The heteroatom-substituted alkyl group having 1 to 20 carbon atoms may be a group in which at least one hydrogen atom in the alkyl group having 1 to 10 carbon atoms is substituted with at least one element selected from a halogen, N, O, and S atoms, and for example, it may be a trifluoromethyl group or a thioxymethyl group.

The fluoroalkyl group having 1 to 20 carbon atoms may be a group in which at least one hydrogen in the alkyl group having 1 to 10 carbon atoms is substituted with fluorine, and the fluoroalkoxy group having 1 to 10 carbon atoms may be a group in which at least one hydrogen in the alkoxy group having 1 to 10 carbon atoms is substituted with fluorine.

The halogen may be fluorine (F), chlorine (Cl), bromine (Br), or iodine (I).

The nitrogen oxide is a compound in which a nitrogen atom and an oxygen atom are bonded, and the nitrogen oxide functional group means a functional group containing a nitrogen oxide in the functional group. As an example of the nitrogen oxide functional group, a nitro group (—NO$_2$) or the like can be used.

The alkoxy group having 1 to 20 carbon atoms may be straight-chain, branched, or cyclic alkoxy groups. Specifically, the alkoxy group having 1 to 10 carbon atoms may be a straight-chain alkoxy group having 1 to 10 carbon atoms; a straight-chain alkoxy group having 1 to 5 carbon atoms; a branched or cyclic alkoxy group having 3 to 10 carbon atoms; or a branched or cyclic alkoxy group having 3 to 6 carbon atoms. More specifically, examples of the alkoxy group having 1 to 10 carbon atoms may include a methoxy group, an ethoxy group, an N-propoxy group, an iso-propoxy group, an N-butoxy group, an iso-butoxy group, a tert-butoxy group, an N-pentoxy group, an iso-pentoxy group, a neo-pentoxy group, a cycloheptoxy group, or the like.

The alkenyl group having 1 to 20 carbon atoms may be straight-chain, branched, or cyclic alkenyl groups. Specifically, the alkenyl group having 1 to 10 carbon atoms may be a straight-chain alkenyl group having 2 to 10 carbon atoms, a straight-chain alkenyl group having 2 to 5 carbon atoms, a branched alkenyl group having 3 to 10 carbon atoms, a branched alkenyl group having 3 to 6 carbon atoms, a cyclic alkenyl group having 5 to 10 carbon atoms, or a cyclic alkenyl group having 6 to 8 carbon atoms. More specifically, examples of the alkenyl group having 2 to 10 carbon atoms may include an ethenyl group, a propenyl group, a butenyl group, a pentenyl group, a cyclohexenyl group, or the like.

The alkynyl group having 2 to 20 carbon atoms may be straight-chain or branched alkynyl groups. Specifically, an alkynyl group having 2 to 20 carbon atoms may be a straight-chain alkynyl group having 2 to 20 carbon atoms, a straight chain alkynyl group having 2 to 5 carbon atoms, a branched alkynyl group having 2 to 20 carbon atoms, or a branched alkynyl group having 2 to 10 carbon atoms. More specifically, the alkynyl group having 2 to 20 carbon atoms may be an ethynyl group, a propynyl group, a butanyl group, a pentanyl group, or the like.

As used herein, the aryl group is not particularly limited, but preferably has 6 to 60 carbon atoms, and may be a monocyclic aryl group or a polycyclic aryl group. According to one embodiment, the number of carbon atoms of the aryl group is 6 to 30. According to another embodiment, the number of carbon atoms of the aryl group is 6 to 20. Specific examples of the monocyclic aryl group include a phenyl group, a biphenyl group, a terphenyl group, and the like, but are not limited thereto. Examples of the polycyclic aryl group include a naphthyl group, an anthracenyl group, a phenanthryl group, a pyrenyl group, a perylenyl group, a chrysenyl group, a fluorenyl group, and the like, but are not limited thereto.

The arylalkyl group having 6 to 30 carbon atoms is a functional group in which the above-mentioned aryl group having 6 to 20 carbon atoms is substituted instead of the hydrogen atom contained in the alkyl group having 1 to 20 carbon atoms, and the description of the alkyl group and the aryl group may include the above-mentioned description. Specifically, examples of the arylalkyl group having 6 to 30 carbon atoms include a phenylmethyl group or the like.

As used herein, the alkylene group is a bivalent functional group derived from alkane, and for example, it may be straight-chain, branched, or cyclic, and may be a methylene group, an ethylene group, a propylene group, an isobutylene group, a sec-butylene group, a tert-butylene group, a pentylene group, a hexylene group, or the like.

As used herein, the heteroalkylene group is an alkylene group containing oxygen (O), nitrogen (N), or sulfur (S) as a heteroatom, and the number of carbon atoms thereof is 1 to 10, or 1 to 5. Examples thereof may be oxyalkylene and the like. At least one hydrogen atom contained in the heteroalkylene group may be substituted with a substituent as in the case of the alkyl group.

As used herein, the cycloalkylene group is a divalent functional group derived from a cycloalkane, and the number of carbon atoms thereof is 3 to 20, or 3 to 10. Examples thereof include, but are not limited to, cyclopropylene, cyclobutylene, cyclopentylene, 3-methylcyclopentylene, 2,3-dimethylcyclopentylene, cyclohexylene, 3-methylcyclohexylene, 4-methylcyclohexylene, 2,3-dimethylcyclohexylene, 3,4,5-trimethylcyclohexylene, 4-tert-butylcyclohexylene, cycloheptylene, cyclooctylene, and the like.

As used herein, the arylene group may be a bivalent functional group derived from an arene, it may be monocyclic or polycyclic, and the number of carbons thereof is 6 to 20, or 6 to 10. Examples thereof may include, but are not limited to, a phenylene group, a biphenylene group, a terphenylene group, a stilbenylene group, a naphthylenyl group, or the like. At least one hydrogen atom contained in the arylene group may be substituted with a substituent as in the case of the alkyl group.

As used herein, the heteroarylene group has 2 to 20 carbon atoms, 2 to 10 carbon atoms, or 6 to 20 carbon atoms. It is an arylene group containing O, N, or S as a heteroatom, and at least one hydrogen atom contained in the heteroarylene group may be substituted with a substituent as in the case of the alkyl group, respectively.

As used herein, the amine group may be selected from the group consisting of —NH$_2$, a monoalkylamine group, a monoalkoxyalkylamine group, a dialkylamine group, an N-alkylarylamine group, a monoarylamine group, a diarylamine group, an N-arylheteroarylamine group, an N-alkylheteroarylamine group, a monoheteroarylamine group, and a diheteroarylamine group, and the number of carbon atoms thereof is not particularly limited, but is preferably 1 to 30. Specific examples of the amine group may include, but not are limited to, a methylamine group, a dimethylamine group, an ethylamine group, a 2-hydroxyethylamine group, a diethylamine group, a phenylamine group, a naphthylamine group, a biphenylamine group, an anthracenylamine group, a 9-methyl-anthracenylamine group, a diphenylamine group, a ditolylamine group, an N-phenylbiphenylamine group, an N-phenylnaphthylamine group, an N-biphenylnaphthylamine group, a ditolylamine group, an N-phenyltolylamine group, a triphenylamine group, an N-naphthylfluorenylamine group, an N-phenylphenanthrenylamine group, an N-biphenyl phenanthrenyl amine group, an N-phenylfluorenylamine group, an N-phenyltriphenylamine group, an N-phenanthrenyl fluorenylamine group, an N-biphenylfluorenylamine group, or the like.

As used herein, the silyl group specifically includes, but is limited to, a trimethylsilyl group, a triethylsilyl group, a trivinylsilyl group, a t-butyldimethylsilyl group, a vinyldimethylsilyl group, a propyldimethylsilyl group, a triphenylsilyl group, a diphenylsilyl group, a phenylsilyl group, or the like.

A multivalent organic group derived from an arbitrary compound means a moiety in which a plurality of hydrogen atoms binding to the arbitrary compound are removed. For example, a tetravalent organic group derived from cyclobutane means a moiety in which any 4 hydrogen atoms binding to cyclobutane are removed.

As used herein, the notation [symbol] or [symbol] in Chemical Formula means a residue in which hydrogens at the relevant site are removed. For example, the notation

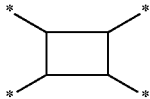 [SMILES: *C1C(*)C(*)C1*]

means a residue in which four hydrogen atoms bonded to carbon numbers 1, 2, 3 and 4 of cyclobutane are removed, that is, it means any one of tetravalent organic groups derived from cyclobutane.

As used herein, a direct bond or a single bond means being connected to a bond line where no atoms or atomic groups exist at the corresponding position. Specifically, it means the case where no other atoms exist in the parts represented as $L_1$ and $L_2$ in the chemical formula.

As used herein, the weight average molecular weight means a weight average molecular weight in terms of polystyrene measured by a GPC method. In the process of determining the weight average molecular weight in terms of polystyrene measured by the GPC method, a commonly known analyzing device, a detector such as a refractive index detector, and an analytical column can be used. Commonly applied conditions for temperature, solvent, and flow rate can be used. Specific examples of the measurement conditions are as follows: Viscotek GPCmax apparatus (Malvern Instruments) equipped with a LT5000L mixed medium org 300 mm column is used at an evaluation temperature of 40° Q dimethylformamide (DMF) and tetrahydrofuran (THF) are used as solvents, the flow rate is 0.8 mL/min, a sample is prepared at a concentration of 10 mg/10 mL and then fed in an amount of 200 μL, and the value of Mw can be determined using calibration curves formed from a polystyrene standard. The molecular weight of the polystyrene standards used herein is five kinds of 600/3000/10,000/50,000/200,000.

Polymer

The polymer includes a polyimide or a precursor thereof. The precursor of the polyimide may include a polyamic acid or a polyamic acid ester.

Specifically, the polymer may include a first polymer for a liquid crystal aligning agent including one or more repeating units selected from the group consisting of a repeating unit represented by the following Chemical Formula 2, a repeating unit represented by the following Chemical Formula 3, and a repeating unit represented by the following Chemical Formula 4; and a second polymer for a liquid crystal aligning agent including one or more repeating units selected from the group consisting of a repeating unit represented by the following Chemical Formula 5, a repeating unit represented by the following Chemical Formula 6, and a repeating unit represented by the following Chemical Formula 7.

[Chemical Formula 2]

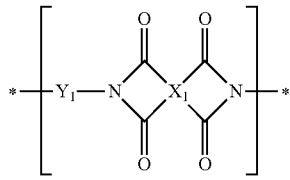

[Chemical Formula 3]

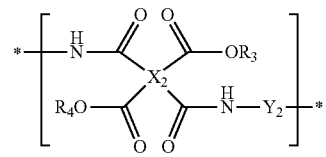

[Chemical Formula 4]

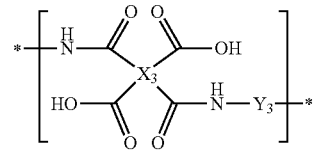

[Chemical Formula 5]

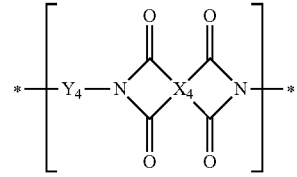

[Chemical Formula 6]

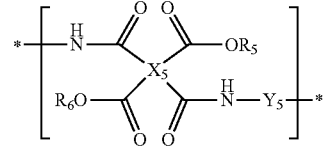

[Chemical Formula 7]

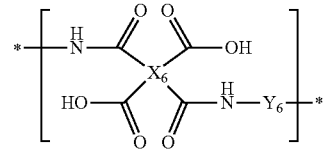

In Chemical Formulas 2 to 7, at least one of $R_3$ and $R_4$ is an alkyl group having 1 to 10 carbon atoms and the rest are hydrogen, at least one of $R_5$ and $R_6$ is an alkyl group having 1 to 10 carbon atoms and the rest are hydrogen, and $X_1$ to $X_6$ are each independently a tetravalent organic group represented by the following Chemical Formula 8,

[Chemical Formula 8]

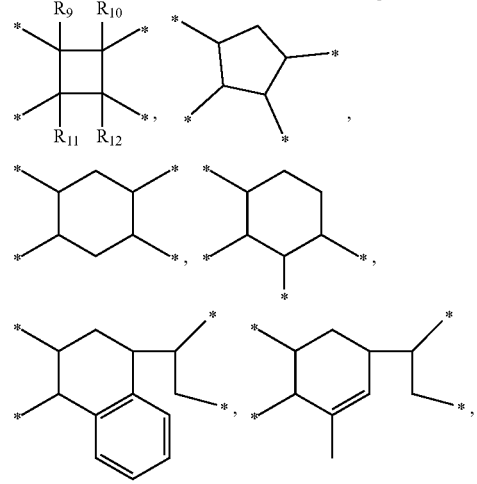

-continued

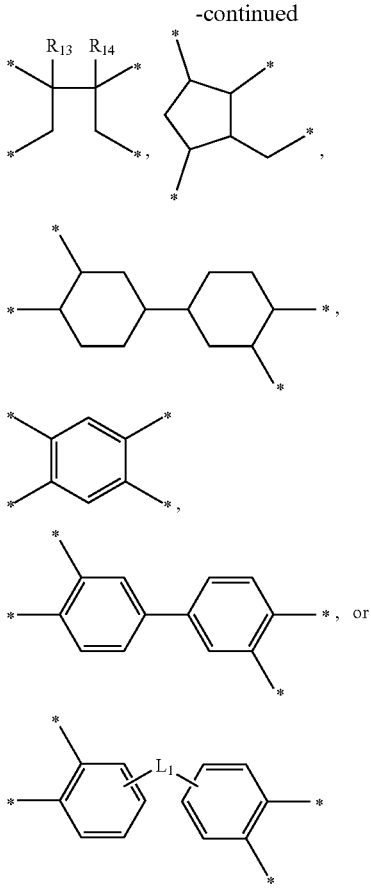

in Chemical Formula 8, $R_9$ to $R_{14}$ are each independently hydrogen or an alkyl group having 1 to 6 carbon atoms, $L_1$ is any one selected from the group consisting of a single bond, —O—, —CO—, —COO—, —S—, —SO—, —SO$_2$—, —CR$_{15}$R$_{16}$—, —(CH$_2$)$_z$—, —O(CH$_2$)$_z$O—, —COO(CH$_2$)$_z$OCO—, —CONH—, phenylene, or a combination thereof, wherein $R_{15}$ and $R_{16}$ are each independently hydrogen, an alkyl group, or a fluoroalkyl group having 1 to 10 carbon atoms, z is an integer of 1 to 10, $Y_1$ to $Y_3$ are each independently a divalent organic group represented by the following Chemical Formula 9,

[Chemical Formula 9]

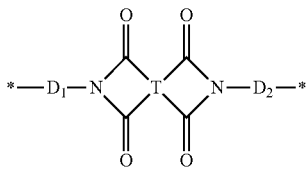

in Chemical Formula 9, T is a tetravalent organic group represented by Chemical Formula 8, $D_1$ and $D_2$ are each independently an alkylene group having 1 to 20 carbon atoms, a heteroalkylene group having 1 to 10 carbon atoms, a cycloalkylene group having 3 to 20 carbon atoms, an arylene group having 6 to 20 carbon atoms, or a heteroarylene group having 2 to 20 carbon atoms, $Y_4$ to $Y_6$ are each independently a divalent organic group represented by the following Chemical Formula 10,

[Chemical Formula 10]

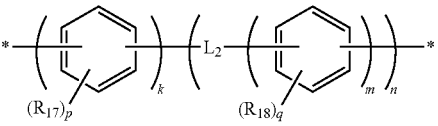

in Chemical Formula 10, $R_{17}$ and $R_{18}$ are each independently hydrogen, a halogen, a cyano, a nitrile, an alkyl having 1 to 10 carbon atoms, an alkenyl having 1 to 10 carbon atoms, an alkoxy having 1 to 10 carbon atoms, a fluoroalkyl having 1 to 10 carbon atoms, or a fluoroalkoxy having 1 to 10 carbon atoms, p and q are each independently an integer of 0 to 4, $L_2$ is a single bond, —O—, —CO—, —S—, —SO$_2$—, —C(CH$_3$)$_2$—, —C(CF$_3$)$_2$—, —CONH—, —COO—, —(CH$_2$)$_y$—, —O(CH$_2$)$_y$O—, —O(CH$_2$)$_y$—, —NH—, —NH(CH$_2$)$_y$—NH—, —NH(CH$_2$)$_y$O—, —OCH$_2$—C(CH$_3$)$_2$—CH$_2$O—, —COO—(CH$_2$)$_y$—OCO—, or —OCO—(CH$_2$)$_y$—COO—, y is an integer of 1 to 10, k and to are each independently an integer of 0 to 3, and n is an integer of 0 to 3.

Specifically, the first polymer for a liquid crystal aligning agent may include any one of a repeating unit represented by Chemical Formula 2, a repeating unit represented by Chemical Formula 3, and a repeating unit represented by Chemical Formula 4, or a mixture of two types thereof, or a mixture of all three types thereof.

Further, the second polymer for a liquid crystal aligning agent may include any one of a repeating unit represented by Chemical Formula 5, a repeating unit represented by Chemical Formula 6, and a repeating unit represented by Chemical Formula 7, or a mixture of two types thereof, or a mixture of all three types thereof.

Specifically, in the first polymer for a liquid crystal aligning agent and the second polymer for a liquid crystal aligning agent contained in the liquid crystal aligning agent composition according to one embodiment of the invention, $X_1$ to $X_6$ may each independently be a tetravalent organic group represented by Chemical Formula 8.

More preferably, the $X_1$ to $X_6$ may each independently be an organic group of the following Chemical Formula 8-1 derived from pyromellitic dianhydride, an organic group of the following Chemical Formula 8-2 derived from 1,3-dimethylcyclobutane-1,2,3,4-tetracarboxylic dianhydride, or an organic group of the following Chemical Formula 8-3 derived from 4,4'-oxydiphthalic dianhydride.

[Chemical Formula 8-1]

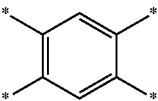

[Chemical Formula 8-2]

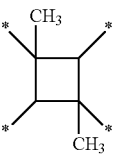

[Chemical Formula 8-3]

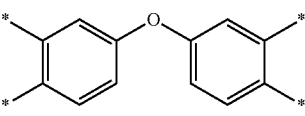

Meanwhile, in the liquid crystal aligning agent composition according to the one embodiment, the first polymer for a liquid crystal aligning agent may include the repeating units of Chemical Formulas 1 to 3, where $Y_1$ to $Y_3$ are each independently a divalent organic group represented by Chemical Formula 9. As the first polymer is synthesized from a diamine containing imide repeating units that have already been imidized, anisotropy can be produced by directly irradiating light without a high-temperature heat treatment process after the formation of the coating film, followed by conducting a heat treatment, thereby completing the preparation of the alignment film. Therefore, not only can the light irradiation energy be significantly reduced, but also a liquid crystal alignment film having excellent alignment properties and stability as well as an excellent voltage holding ratio and electrical characteristics can be prepared even by a simple process step including one heat treatment step.

Specifically, in Chemical Formula 9, T is the following Chemical Formula 9-1 or 9-2, and $D_1$ and $D_2$ may each independently be a phenylene group.

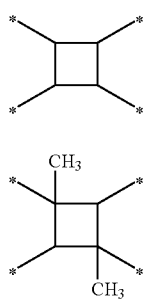

[Chemical Formula 9-1]

[Chemical Formula 9-2]

Among the repeating units represented by Chemical Formulas 1, 2, and 3 contained in the first polymer for a liquid crystal aligning agent, the repeating unit represented by Chemical Formula 1 may be contained in an amount of 5 mol % to 74 mol %, or 10 mol % to 60 mol %, based on the total repeating units.

As described above, when a polymer containing a specific amount of the imide repeating unit represented by Chemical Formula 1 is used, since the first polymer for a liquid crystal aligning agent contains a certain amount of the imide repeating unit that has already been imidized, it is possible to produce a liquid crystal alignment film having good alignment properties and stability even when light is irradiated immediately without a heat treatment step.

If the repeating unit represented by Chemical Formula 1 is included at less than the content range, sufficient alignment properties may not be exhibited and alignment stability may be deteriorated. On the contrary, if the content of the repeating unit represented by Chemical Formula 1 exceeds the above content range, the solubility is lowered, and thus it may be difficult to prepare a stable alignment solution capable of coating, which is problematic. Accordingly, it is preferable to include the repeating unit represented by Chemical Formula 1 within the above-mentioned content range, because it can provide a polymer for a liquid crystal aligning agent having excellent storage stability, electrical characteristics, alignment properties, and alignment stability.

Further, the repeating unit represented by Chemical Formula 2 or the repeating unit represented by Chemical Formula 3 can be contained in an appropriate amount depending on the desired characteristics.

Specifically, the repeating unit represented by Chemical Formula 2 may be contained in an amount of 0 to 40 mol %, preferably 0 to 30 mol %, based on the total repeating units represented by Chemical Formulas 1 to 3. The repeating unit represented by Chemical Formula 2 has a low imide conversion rate during the high-temperature heat treatment process after the light irradiation, and thus if it exceeds the above range, the region interacting with the liquid crystal becomes lower, and the alignment property may be relatively decreased. Accordingly, the repeating unit represented by Chemical Formula 2 exhibits appropriate solubility within the above-mentioned range and thus can provide a polymer for a liquid crystal aligning agent capable of realizing a high imidization rate, while having excellent process properties.

Moreover, the repeating unit represented by Chemical Formula 3 may be contained in an amount of 0 to 95 mol %, preferably 10 to 90 mol %, based on the total repeating units represented by Chemical Formulas 1 to 3. Within such a range, excellent coating properties can be exhibited, thereby providing a polymer for a liquid crystal aligning agent capable of realizing a high imidization rate, while having excellent process properties.

Meanwhile, in the liquid crystal aligning agent composition according to one embodiment of the invention, the second polymer for a liquid crystal aligning agent may be the repeating units of Chemical Formulas 4 to 6 where $Y_4$ to $Y_6$ may each independently be a bivalent organic group represented by Chemical Formula 10. By including the second polymer for a liquid crystal aligning agent containing the organic group of Chemical Formula 10, the electrical characteristics of the alignment film such as the voltage holding ratio can be greatly improved, the alignment property of the liquid crystal alignment film is amplified, and the mechanical properties can be improved, and thus the durability of the alignment film can be secured.

In Chemical Formula 10, hydrogen is bonded to carbon not substituted with $R_{17}$ or $R_{18}$, and when p or q is an integer of 2 to 4, a plurality of $R_{17}$ or $R_{18}$ may be the same or different substituents. Further, in Chemical Formula 10, k and m are each independently an integer of 0 to 3, or an integer of 1 to 3, and n may be an integer of 0 to 3, or an integer of 0 or 1.

More specifically, examples of Chemical Formula 10 are not particularly limited, but for example, it may be a functional group represented by the following Chemical Formula 10-1 or 10-2.

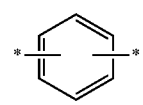

[Chemical Formula 10-1]

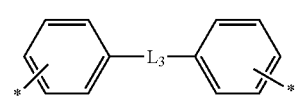

[Chemical Formula 10-2]

In Chemical Formula 10-2, $L_3$ is a single bond, —O—, —SO$_2$—, or —CR$_{30}$R$_{31}$—, wherein $R_{30}$ and $R_{31}$ are each independently hydrogen or an alkyl having 1 to 10 carbon atoms.

Preferably, Chemical Formula 10-1 may be the following Chemical Formula 10-3.

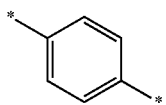
[Chemical Formula 10-3]

Further, Chemical Formula 10-2 may be the following Chemical Formula 10-4.

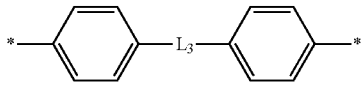
[Chemical Formula 10-4]

In Chemical Formula 10-4, $L_3$ is —O— or —$CH_2$—.

In addition, the first polymer for a liquid crystal aligning agent and the second polymer for a liquid crystal aligning agent may be mixed at a weight ratio of 1:9 to 9:1, 15:85 to 85:15, or 2:8 to 8:2. As described above, as the liquid crystal aligning agent includes imide repeating units that have already been imidized, it has a feature such that anisotropy is produced by directly irradiating light without a high-temperature heat treatment process after the formation of the coating film, and then a heat treatment is conduced to complete the preparation of the alignment film. The second polymer for a liquid crystal aligning agent has a feature of improving the electrical characteristics such as the voltage holding ratio. When the first polymer for a liquid crystal aligning agent and the second polymer for a liquid crystal aligning agent having such characteristics are mixed and used in the above weight ratio range, excellent photoreaction properties and liquid crystal alignment properties that the first polymer for a liquid crystal aligning agent has can be mutually complemented with excellent electrical characteristics that the second polymer for a liquid crystal aligning agent has. Therefore, it is possible to prepare a liquid crystal alignment film having superior alignment properties and electrical characteristics at the same time.

Polyoxazoline Crosslinking Agent

In addition to the above-mentioned polymer for a liquid crystal aligning agent, the liquid crystal aligning agent composition of one embodiment of the present invention includes a polyoxazoline crosslinking agent, and thereby, a liquid crystal alignment film prepared therefrom can exhibit improved mechanical strength and simultaneously realize high reliability and excellent electrical characteristics.

The polyoxazoline crosslinking agent includes a polymer, an oligomer, and a macromolecular synthesized through polymerization of at least one oxazoline compound, and the polyoxazoline crosslinking agent may include a homopolymer of one oxazoline compound or a copolymer of two or more oxazoline compounds. The copolymer includes both random copolymers and block copolymers.

Specifically, the polyoxazoline crosslinking agent may include a repeating unit represented by the following Chemical Formula 1.

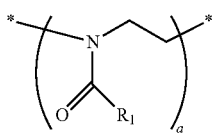
[Chemical Formula 1]

In Chemical Formula 1, $R_1$ is an alkyl group having 1 to 20 carbon atoms or a heteroatom-substituted alkyl group having 1 to 20 carbon atoms, and a is an integer of 1 to 10,000. Examples of the heteroatom-substituted alkyl group having 1 to 20 carbon atoms are not particularly limited, but for example, may be a trifluoromethyl group, a thioxymethyl group, or the like.

As described above, as the polyoxazoline crosslinking agent contains two or more amide functional groups which are crosslinkable functional groups, the surface area capable of reacting with the polyamic acid repeating unit or the polyamic acid ester repeating unit or the like in the liquid crystal aligning composition can be increased, thus exhibiting high crosslinking reactivity and more easily forming a cross-linked structure.

The polyoxazoline crosslinking agent may be at least one selected from the group consisting of an alkyl group having 1 to 20 carbon atoms, a hydroxyl group, a thiol group, an alkynyl group, an amine group, an azide group, and a silyl group that may be bonded to one end thereof. The one end refers to one end of the repeating unit represented by Chemical Formula 1. Preferably, an ethynyl group may be used as the alkynyl group, a 2-hydroxyethylamine group may be used as the amine group, and a trivinylsilyl group may be used as the silyl group.

In addition, the polyoxazoline crosslinking agent may be at least one selected from the group consisting of an alkyl group having 1 to 20 carbon atoms, a heteroatom-substituted alkyl group having 1 to 20 carbon atoms, an alkynyl group having 2 to 20 carbon atoms, an aryl group having 6 to 20 carbon atoms, and an arylalkyl group having 6 to 30 carbon atoms that is bonded to the other end which is opposite to the one end.

More specifically, the polyoxazoline crosslinking agent may include a homopolymer represented by the following Chemical Formula 1-1.

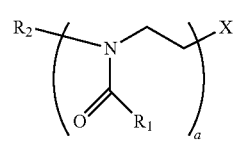
[Chemical Formula 1-1]

In Chemical Formula 1-1, $R_1$ is an alkyl group having 1 to 20 carbon atoms or a heteroatom-substituted alkyl group having 1 to 20 carbon atoms, $R_2$ is an alkyl group having 1 to 20 carbon atoms, a heteroatom-substituted alkyl group having 1 to 20 carbon atoms, an alkynyl group having 2 to 20 carbon atoms, an aryl group having 6 to 20 carbon atoms, or an arylalkyl group having 6 to 30 carbon atoms, X is an alkyl group having 1 to 20 carbon atoms, a hydroxyl group, a thiol group, an alkynyl group, an amine group, an azide group, or a silyl group, and a is an integer of 1 to 10,000.

Preferably, the polyoxazoline crosslinking agent may be a polymer of Chemical Formula A of Example 4 in which, in Chemical Formula 1-1, $R_1$ is an ethyl group having 2 carbon atoms, $R_2$ is a methyl group, X is a methyl group, and a is an integer of 1 to 10,000. Further, it may be a polymer of Chemical Formula B of Example 4 in which, in Chemical Formula 1-1, $R_1$ is a methyl group having one carbon atom, X is a methyl group, and a is an integer of 1 to 10,000. Further, it may be a polymer of Chemical Formula C of Example 5 in which, in Chemical Formula 1-1, $R_1$ is an isopropyl group having three carbon atoms, $R_2$ is a methyl group, X is a methyl group, and a is an integer of 1 to 10,000.

Further, the polyoxazoline crosslinking agent may include a copolymer containing two or more different repeating units which can be represented by Chemical Formula 1. The copolymer includes both random copolymers and block copolymers.

More specifically, the polyoxazoline crosslinking agent may include a copolymer represented by the following Chemical Formula 1-2.

[Chemical Formula 1-2]

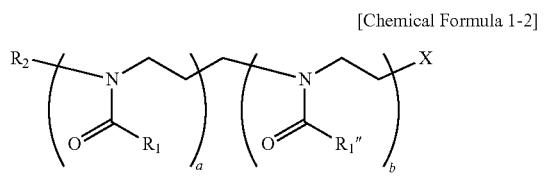

In Chemical Formula 1-2, $R_1$ is an alkyl group having 1 to 20 carbon atoms or a heteroatom-substituted alkyl group having 1 to 20 carbon atoms, $R_2$ is an alkyl group having 1 to 20 carbon atoms, a heteroatom-substituted alkyl group having 1 to 20 carbon atoms, an alkynyl group having 2 to 20 carbon atoms, an aryl group having 6 to 20 carbon atoms, or an arylalkyl group having 6 to 30 carbon atoms, $R_1''$ is an alkyl group having 1 to 20 carbon atoms or a heteroatom-substituted alkyl group having 1 to 20 carbon atoms, $R_1$ and $R_1''$ are different from each other, X is an alkyl group having 1 to 20 carbon atoms, a hydroxyl group, a thiol group, an alkynyl group, an amine group, an azide group, or a silyl group, and a and b are each independently an integer of 1 or more, or 1 to 10,000.

The polyoxazoline crosslinking agent may have a weight average molecular weight (measured by GPC) of 5000 g/mol to 1,000,000 g/mol.

When the weight average molecular weight of the polyoxazoline crosslinking agent is excessively large, the alignment is not performed in the alignment step after exposure, which may cause an afterimage. On the other hand, if the weight average molecular weight of the polyoxazoline crosslinking agent becomes excessively small, it may cause a technical problem in that, due to a decrease in the chemical resistance of the polyoxazoline crosslinking agent, the alignment properties are decreased and the electrical characteristics are rather decreased.

The polyoxazoline crosslinking agent is preferably contained in an amount of 0.1 to 20% by weight based on the total weight of the liquid crystal aligning agent composition.

If the content of the polyoxazoline crosslinking agent is excessively large, the degree of crosslinking of the polymer for a liquid crystal aligning agent is excessively increased, and thereby the flexibility of the polymer can be reduced, and the viscosity of the composition increases or a gelation reaction occurs in the composition, so that the coatability to the substrate can be lowered.

On the other hand, if the content of the polyoxazoline crosslinking agent becomes excessively small, it may be difficult to sufficiently realize the effects of improving the mechanical strength due to an increase in the degree of crosslinking of the polymer for a liquid crystal aligning agent.

Compound Having Two or More Epoxy Groups in the Molecule

In addition, the present inventors found that by incorporating a compound having two or more, or two to six epoxy groups in a molecule in addition to the polymer for a liquid crystal aligning agent in a liquid crystal aligning agent composition, the liquid crystal alignment film prepared therefrom can not only exhibit a high voltage holding ratio but can also improve the alignment stability due to heat stress and the mechanical strength of the alignment film.

Although not being limited theoretically, in the heat treatment process after the generation of anisotropy by light irradiation, a thermal crosslinking reaction occurs between the compound having an epoxy group and the carboxylic acid group of the polyimide precursor or the partially imidized polymer, thereby increasing the voltage holding ratio. In addition, since a compound having two or more epoxy groups in the molecule is used, not only are these properties further improved, but also a crosslinking reaction occurs between the polyimide precursor or partially imidized polymer chains, thereby improving the alignment stability and the mechanical strength of the alignment film.

The molecular weight of the compound having two or more epoxy groups in the molecule is preferably 100 g/mol to 10,000 g/mol.

As the compound having two or more epoxy groups in the molecule, a cycloaliphatic epoxy, a bisphenol-based epoxy, or a novolak-based epoxy may be used.

Specifically, a compound having two or more epoxy groups in the molecule may be represented by the following Chemical Formula 11.

[Chemical Formula 11]

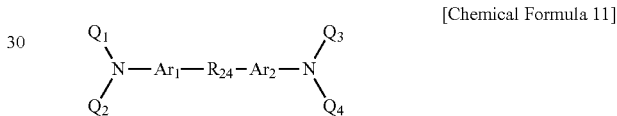

In Chemical Formula 11, $R_{24}$ is an alkylene group having 1 to 10 carbon atoms, $Ar_1$ and $Ar_2$ are each independently an arylene group having 6 to 10 carbon atoms, and $Q_1$ to $Q_4$ are each independently hydrogen or a glycidyl group.

Specific examples of the compound having two or more epoxy groups in the molecule may include (3',4'-epoxycyclohexane)methyl 3,4-epoxycyclohexyl carboxylate, 4,4'-methylenebis(N,N'-diglycidylaniline), 2,2'-(3,3',5,5'-tetramethylbiphenyl-4,4'-diyl)bis(oxy)bis(methylene) dioxirane, and N,N,N',N'-tetraglycidyl-4,4'-diaminodiphenylmethane.

Further, the compound having two or more epoxy groups in the molecule is preferably contained in an amount of 0.1 to 30 parts by weight based on 100 parts by weight of the total weight of the first polymer for a liquid crystal aligning agent and the second polymer for a liquid crystal aligning agent.

Method for Preparing Liquid Crystal Alignment Film

In addition, the present invention provides a method for preparing a liquid crystal alignment film including the steps of: coating the liquid crystal aligning agent composition onto a substrate to form a coating film (step 1); drying the coating film (step 2); irradiating the coating film immediately after the drying step with light or rubbing the coating film to perform alignment treatment (step 3); and heat-treating and curing the alignment-treated coating film (step 4).

Step 1 is a step of coating the liquid crystal aligning agent composition onto a substrate to form a coating film.

The method of coating the liquid crystal aligning agent composition onto a substrate is not particularly limited, and for example, a method such as screen printing, offset printing, flexographic printing, inkjet printing, and the like can be used.

Further, the liquid crystal aligning agent composition may be dissolved or dispersed in an organic solvent. Specific examples of the organic solvent include N,N-dimethylformamide, N,N-dimethylacetamide, N-methyl-2-pyrrolidone, N-methylcaprolactam, 2-pyrrolidone, N-ethylpyrrolidone, N-vinylpyrrolidone, dimethylsulfoxide, tetramethylurea, pyridine, dimethyl sulfone, hexamethyl sulfoxide, γ-butyrolactone, 3-methoxy-N,N-dimethylpropanamide, 3-ethoxy-N,N-dimethylpropanamide, 3-butoxy-N,N-dimethylpropanamide, 1,3-dimethyl-imidazolidinone, ethyl amyl ketone, methyl nonyl ketone, methyl ethyl ketone, methyl isoamyl ketone, methyl isopropyl ketone, cyclohexanone, ethylene carbonate, propylene carbonate, diglyme, 4-hydroxy-4-methyl-2-pentanone, ethylene glycol monomethyl ether, ethylene glycol monomethyl ether acetate, ethylene glycol monoethyl ether, ethylene glycol monoethyl ether acetate, ethylene glycol monopropyl ether, ethylene glycol monopropyl ether acetate, ethylene glycol monoisopropyl ether, ethylene glycol monoisopropyl ether acetate, ethylene glycol monobutyl ether, ethylene glycol monobutyl ether acetate, and the like. They can be used alone or in combination of two or more.

In addition, the liquid crystal aligning agent composition may further include other components in addition to the organic solvent. In a non-limiting example, when the liquid crystal aligning agent composition is coated, additives capable of improving the uniformity of the thickness of a film and the surface smoothness, improving the adhesion between a liquid crystal alignment film and a substrate, changing the dielectric constant and conductivity of a liquid crystal alignment film, or increasing the denseness of a liquid crystal alignment film, may be further included. Examples of these additives include various kinds of solvents, surfactants, silane-based compounds, dielectrics, crosslinking compounds, etc.

Step 2 is a step of drying the coating film formed by coating the liquid crystal aligning agent composition onto a substrate.

The step of drying the coating film may be performed by using a method such as heating of a coating film or vacuum evaporation, and is preferably performed at 50° C. to 150° C., or 60° C. to 140° C.

Step 3 is a step of irradiating the coating film immediately after the drying step with light or rubbing the coating film to perform alignment treatment.

As used herein, the "irradiating coating film immediately after the drying step" refers to irradiating the film with light immediately after the drying without carrying out heat treatment at a temperature higher than that of the drying step, and steps other than the heat treatment can be added.

More specifically, when a liquid crystal alignment film is prepared by using a conventional liquid crystal aligning agent including a polyamic acid or a polyamic acid ester, it includes a step of irradiating light after essentially performing a high-temperature heat treatment for imidization of polyamic acid. However, when a liquid crystal alignment film is prepared using the liquid crystal aligning agent of the one embodiment described above, it does not include the heat treatment step, and light is directly irradiated to perform alignment treatment, and then the alignment-treated coating film is cured by a heat treatment, thereby being capable of preparing a liquid crystal alignment film.

Further, in the alignment treatment step, the light irradiation may be performed by irradiating polarized ultraviolet rays having a wavelength of 150 nm to 450 nm. In this case, the intensity of the light exposure may vary depending on the kind of the polymer for a liquid crystal aligning agent, and preferably energy of 10 mJ/cm$^2$ to 10 J/cm$^2$, or 30 mJ/cm$^2$ to 2 J/cm$^2$, may be irradiated.

As for the ultraviolet rays, polarized ultraviolet rays selected among the ultraviolet rays subjected to polarization treatment by a method of passing through or reflecting by a polarizing device using a substrate in which a dielectric anisotropic material is coated onto the surface of a transparent substrate such as quartz glass, soda lime glass, soda lime-free glass, etc., a polarizer plate on which aluminum or metal wires are finely deposited, or a Brewster's polarizing device by the reflection of quartz glass, etc., are irradiated to perform the alignment treatment. Herein, the polarized ultraviolet rays may be irradiated perpendicularly to the surface of the substrate, or may be irradiated by directing an angle of incidence toward a specific angle. By this method, the alignment capability of the liquid crystal molecules is imparted to the coating film.

Further, in the alignment treatment step, a rubbing treatment may employ a method using a rubbing cloth. More specifically, in the rubbing treatment, the surface of the coating film after the heat treatment step can be rubbed in one direction while rotating the rubbing roller in which a rubbing cloth is attached to a metal roller.

Step 4 is a step of heat-treating and curing the alignment-treated coating film.

The step of heat-treating and curing the alignment-treated coating film is a step that is performed after light irradiation even in the conventional method of preparing a liquid crystal alignment film using a polymer for a liquid crystal aligning agent containing a polyamic acid or a polyamic acid ester, and is distinguished from a heat treatment step that is performed by coating the liquid crystal aligning agent composition onto a substrate and then performing imidization of the liquid crystal aligning agent before irradiating the light or while irradiating the light.

In this case, the heat treatment may be performed by a heating means such as a hot plate, a hot-air circulation furnace, an infrared furnace, and the like, and the heat treatment is preferably performed at a temperature of 150° C. to 300° C., or 180° C. to 250° C.

Meanwhile, after a step of drying the coating film (step 2), the method may further include heat-treating the coating film immediately after the drying step at a temperature equal to or higher than the drying step, if necessary. The heat treatment may be performed by a heating means such as a hot plate, a hot-air circulation furnace, or an infrared furnace, and is preferably carried out at 150° C. to 250° C. In this process, the liquid crystal aligning agent can be imidized.

That is, the method for preparing a liquid crystal alignment film may include the steps of: coating the above-mentioned liquid crystal aligning agent onto a substrate to form a coating film (step 1); drying the coating film (step 2); heat-treating the coating film immediately after the drying step at a temperature equal to or higher than the drying step (step 3); irradiating the heat-treated coating film with light or rubbing the coating film to perform alignment treatment (step 4); and heat-treating and curing the alignment-treated coating film (step 5).

Liquid Crystal Alignment Film

Further, the present invention may provide a liquid crystal alignment film prepared in accordance with the method for preparing a liquid crystal alignment film described above.

Specifically, the liquid crystal alignment film may include an aligned cured product of the liquid crystal aligning agent composition of the one embodiment. The aligned cured product means a material obtained through an alignment step and a curing step of the liquid crystal aligning agent composition of the one embodiment.

As described above, when a liquid crystal aligning agent composition containing the polymer containing a polyimide or a precursor thereof, and the polyoxazoline crosslinking agent containing a repeating unit represented by Chemical Formula 1 is used, a liquid crystal alignment film having enhanced film strength and high reliability while exhibiting excellent alignment properties and electrical characteristics can be prepared.

The thickness of the liquid crystal alignment film is not particularly limited, but for example, it can be freely adjusted within the range of 0.01 μm to 1000 μm. If the thickness of the liquid crystal alignment film increases or decreases by a specific value, the physical properties measured in the alignment film may also change by a certain value.

Specifically, the liquid crystal alignment film may have film strength calculated by the following Mathematical Formula 1 of 1.0% or less, 0.01% to 1.0%, 0.01% to 0.90%, or 0.10% to 0.87%. The film strength may be a value measured for a liquid crystal alignment film having a thickness of, for example, 0.01 μm to 10 μm, or 0.05 μm to 50 μm.

Film strength (%)=haze (%) of liquid crystal alignment film after rubbing treatment−haze (%) of liquid crystal alignment film before rubbing treatment. [Mathematical Equation 1]

The rubbing treatment for the liquid crystal alignment film can be performed by rubbing the surface of the alignment film while rotating the surface of the alignment film at 850 rpm using a rubbing machine (manufactured by Sindo Engineering). The haze value can be measured using a hazemeter.

Liquid Crystal Display Device

In addition, the present invention provides a liquid crystal display device including the liquid crystal alignment film as described above.

The liquid crystal alignment film may be introduced into a liquid crystal cell by a known method, and likewise, the liquid crystal cell may be introduced into a liquid crystal display device by a known method. The liquid crystal alignment film can be prepared from the liquid crystal aligning agent composition of another embodiment, thereby achieving excellent stability together with excellent various physical properties. Specifically, the liquid crystal display device capable of having a high voltage holding ratio at a high temperature and a low frequency, having excellent electrical characteristics, reducing the performance degradation of the contrast ratio or the image sticking (after-image) phenomenon, and further having excellent film strength can be provided.

Specifically, the liquid crystal display device may have a voltage holding ratio of 85% or more, 85% to 99%, or 90% to 99% as measured by using 6254C equipment (manufactured by TOYO Corporation) at 1 V, 1 Hz, and 60° C. When the voltage holding ratio of the liquid crystal alignment display device measured by using the 6254C equipment (TOYO Corporation) at 1 V, 1 Hz, and 60 t is reduced to less than 85%, it may be difficult to realize a liquid crystal display device having a high-quality driving characteristic at low power.

When adhering polarizing plates to the upper and lower plates so as be perpendicular to each other, then adhering on a backlight of 7000 cd/m$^2$, and observing light leakage with the naked eye, the liquid crystal display device is observed dark without defects without passing light through the upper and lower polarizing plates adhered with their polarizing axes perpendicular to each other, thereby capable of exhibiting excellent liquid crystal alignment properties.

Advantageous Effects

According to the present invention, a liquid crystal aligning agent composition for forming a liquid crystal alignment film having improved film strength and reliability while exhibiting enhanced alignment properties and electrical characteristics, a method for preparing a liquid crystal alignment film using the same, and a liquid crystal alignment film and a liquid crystal display device using the same are provided.

DETAILED DESCRIPTION OF THE EMBODIMENTS

The present invention will be described in more detail by way of examples. However, these examples are given for illustrative purposes only, and the scope of the invention is not intended to be limited by these examples.

Preparation Example 1-1: Synthesis of Diamine

Preparation Example 1-1): Synthesis of Diamine DA-1

Diamine DA-1 was synthesized according to the following reaction scheme.

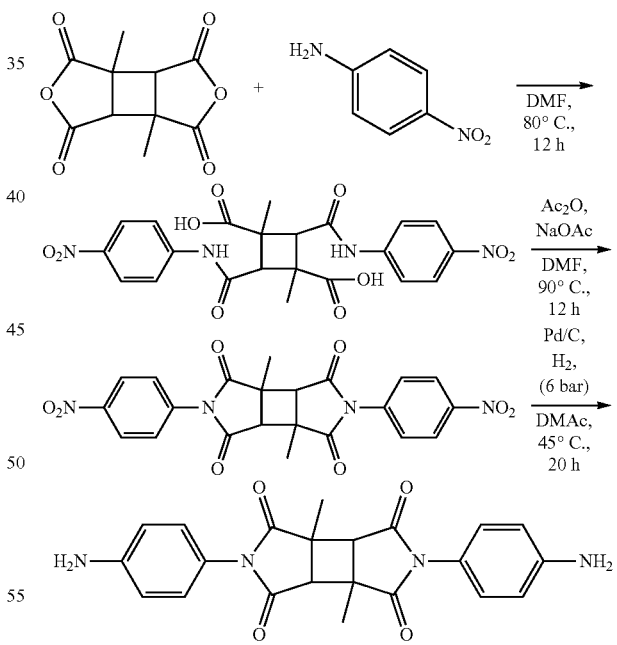

Specifically, 1,3-dimethylcyclobutane-1,2,3,4-tetracarboxylic dianhydride (DMCBDA) and 4-nitroaniline were dissolved in DMF (dimethylformamide) to prepare a mixture. Then, the mixture was reacted at about 80° C. for about 12 hours to prepare an auric acid. Subsequently, the auric acid was dissolved in DMF, and acetic anhydride and sodium acetate were added thereto to prepare a mixture. Then, the auric acid contained in the mixture was imidized at about 90° C. for about 4 hours. The imide thus obtained was dissolved in DMAc (dimethylacetamide), and then Pd/C was added thereto to prepare a mixture. The resulting mixture was reduced at about 45° C. under hydrogen pressure of about 6 bar for 20 minutes to prepare diamine DA-1.

Preparation Example 1-2): Synthesis of Diamine DA-2

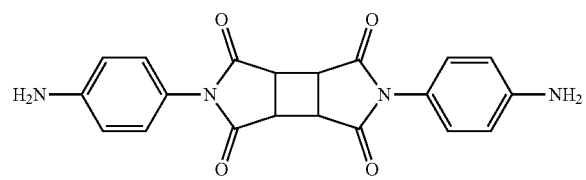 [SMILES: Nc1ccc(N2C(=O)C3C(C2=O)C2C(=O)N(c4ccc(N)cc4)C(=O)C32)cc1]

DA-2 having the above structure was prepared in the same manner as in Preparation Example 1, except that cyclobutane-1,2,3,4-tetracarboxylic dianhydride (CBDA) was used instead of 1,3-dimethylcyclobutane-1,2,3,4-tetracarboxylic dianhydride.

Preparation Example 2: Preparation of Polymer for Liquid Crystal Aligning Agent

Preparation Example 2-1): Preparation of Polymer for Liquid Crystal Aligning Agent P-1

(Step 1)
5.0 g (13.3 mmol) of DA-2 prepared in Preparation Example 1-1 was completely dissolved in 71.27 g of anhydrous N-methyl pyrrolidone (NMP). 2.92 g (13.03 mmol) of 1,3-dimethyl-cyclobutane-1,2,3,4-tetracarboxylic dianhydride (DMCBDA) was then added to the solution under an ice bath and stirred at room temperature for 16 hours.

(Step 2)
The solution obtained in step 1 was added to an excess amount of distilled water to produce a precipitate. The resulting precipitate was then filtered, washed twice with distilled water, and then washed again with methanol three times. The solid product thus obtained was dried in a vacuum oven at 40° C. for 24 hours to obtain 6.9 g of a polymer for a liquid crystal aligning agent P-1.

As a result of confirming the molecular weight of the polymer P-1 through GPC, the number average molecular weight (Mn) was 15,500 g/mol, and the weight average molecular weight (Mw) was 31,000 g/mol. Further, the monomer structure of the polymer P-1 is determined by the equivalent ratio of the monomers used, and the ratio of an imide structure in the molecule was 50.5%, while the ratio of an amic acid structure was 49.5%.

Preparation Example 2-2): Preparation of Polymer for Liquid Crystal Aligning Agent P-2

5.0 g of DA-1 prepared in Preparation Example 1-1 and 1.07 g of p-phenylenediamine (PDA) were completely dissolved in 103.8 g of NMP. 2.12 g of cyclobutane-1,2,3,4-tetracarboxylic dianhydride (CBDA) and 3.35 g of 4,4'-oxydiphthalic dianhydride (OPDA) were added to the solution under an ice bath and stirred for 16 hours at room temperature. Then, the polymer P-2 was prepared in the same manner as in step 2 of Preparation Example 2-1.

As a result of confirming the molecular weight of the polymer P-2 through GPC, the number average molecular weight (Mn) was 18,000 g/mol, and the weight average molecular weight (Mw) was 35,000 g/mol. Further, the polymer P-2 showed that the ratio of an imide structure in the molecule was 36.4%, and the ratio of an amic acid structure was 63.6%.

Preparation Example 2-3): Preparation of Polymer for Liquid Crystal Aligning Agent P-3

6.0 g of DA-2 prepared in Preparation Example 1-2 and 1.37 g of 4,4'-oxydianiline (ODA) were completely dissolved in 110.5 g of NMP. 3.47 g of DMCBDA and 1.44 g of pyromellitic dianhydride (PMDA) were added to the solution under an ice bath and stirred for 16 hours at room temperature. Then, the polymer P-3 was prepared in the same manner as in step 2 of Preparation Example 2-1.

As a result of confirming the molecular weight of the polymer P-3 through GPC, the number average molecular weight (Mn) was 14,500 g/mol, and the weight average molecular weight (Mw) was 29,000 g/mol. Further, the polymer P-3 showed that the ratio of an imide structure in the molecule was 41.9%, and the ratio of an amic acid structure was 58.1%.

Preparation Example 2-4): Preparation of Polymer for Liquid Crystal Aligning Agent Q-1

5.00 g of 4,4'-methylenedianiline and 5.05 g of 4,4'-oxydianiline were completely dissolved in 221.4 g of NMP. 14.55 g of 4,4'-bisphthalic anhydride was added to the solution under an ice bath and stirred for 6 hours at room temperature. Then, the polymer Q-1 was prepared in the same manner as in step 2 of Preparation Example 2-1.

As a result of confirming the molecular weight of the polymer Q-1 through GPC, the number average molecular weight (Mn) was 25,000 g/mol, and the weight average molecular weight (Mw) was 40,000 g/mol.

Examples: Preparation of Liquid Crystal Aligning Agent Composition

Example 1

5 parts by weight of P-1 prepared in Preparation Example 2-1, 5 parts by weight of Q-1 prepared in Preparation Example 2-4, 0.5 parts by weight of N,N,N',N'-tetraglycidyl-4,4'-diaminodiphenylmethane (TGMDA), and 1 part by weight of a polymer of the following Chemical Formula A [PEOX, weight average molecular weight: about 50,000 g/mol] were completely dissolved in a mixed solvent of NMP and N-butoxyethanol in a weight ratio of 8 to 2. Then, the obtained solution was subjected to pressure filtration through a filter having a pore size of 0.2 μm made of poly(tetrafluoroethylene) to prepare a liquid crystal aligning agent composition.

[Chemical Formula A]

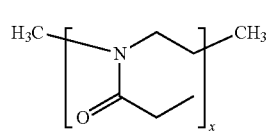

in Chemical Formula A, x is 500 to 510 (about 505).

Example 2

A liquid crystal aligning agent composition was prepared in the same manner as in Example 1, except that P-2 prepared in Preparation Example 2-2 was used instead of P-1 prepared in Preparation Example 2-1.

Example 3

A liquid crystal aligning agent composition was prepared in the same manner as in Example 1, except that P-3 prepared in Preparation Example 2-3 was used instead of P-1 prepared in Preparation Example 2-1.

Example 4

A liquid crystal aligning agent composition was prepared in the same manner as in Example 1, except that a polymer of the following Chemical Formula B (number average molecular weight: about 10,000 g/mol) was used instead of a polymer of Chemical Formula A.

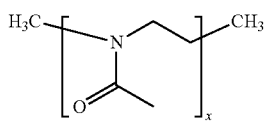

[Chemical Formula B]

In Chemical Formula B, x is 110 to 120 (about 117).

Example 5

A liquid crystal aligning agent composition was prepared in the same manner as in Example 1, except that a polymer of the following Chemical Formula C (number average molecular weight: about 10,000 g/mol) was used instead of a polymer of Chemical Formula A.

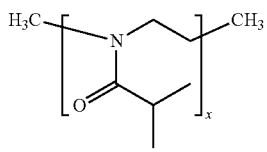

[Chemical Formula C]

In Chemical Formula C, x is 80 to 90 (about 88).

Comparative Example: Preparation of Liquid Crystal Aligning Agent Composition

Comparative Example 1

A liquid crystal aligning agent composition was prepared in the same manner as in Example 1, except that a polymer of Chemical Formula A was not used.

Comparative Example 2

A liquid crystal aligning agent composition was prepared in the same manner as in Example 1, except that N,N,N',N'-tetraglycidyl-4,4'-diaminodiphenylmethane was not used.

Comparative Example 3

A liquid crystal aligning agent composition was prepared in the same manner as in Example 1, except that Q-1 prepared in Preparation Example 2-4 was used instead of P-1 prepared in Preparation Example 2-1.

Comparative Example 4

A liquid crystal aligning agent composition was prepared in the same manner as in Example 1, except that poly (styrene-co-2-isopropenyl-oxazoline) (EPOCROS RPS-1005, manufactured by Nippon Shokubai Co., Ltd.) having a structure of the following Chemical Formula D was used instead of a polymer of Chemical Formula A.

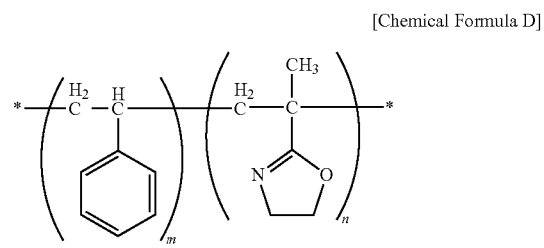

[Chemical Formula D]

Experimental Example 1

1) Preparation of Liquid Crystal Alignment Cell

A liquid crystal alignment cell was prepared by using the liquid crystal aligning agent compositions prepared in the examples and comparative examples.

Specifically, the liquid crystal alignment agent compositions prepared in the examples and comparative examples were coated onto a substrate (lower plate) in which comb-shaped IPS (in-plane switching) mode type of ITO electrode patterns having a thickness of 60 nm, an electrode width of 3 μm, and an interval between electrodes of 6 μm were formed on a rectangular glass substrate having a size of 2.5 cm×2.7 cm and a glass substrate (upper plate) in which the electrode patterns were not formed, respectively, by using a spin coating method.

Subsequently, the substrates coated with the liquid crystal alignment agent were placed and dried on a hot plate at about 70° C. for 3 minutes to evaporate the solvent. In order to align the coating films thus obtained, the respective coating films of the upper and lower plates were irradiated with 254 nm ultraviolet rays in an exposure amount of 1 J/cm² using an exposure machine to which a linear polarizer was attached.

Then, the aligned upper and lower plates were fired (cured) in an oven at about 230° C. for 30 minutes to obtain a coating film having a film thickness of 0.1 μm. Then, a sealing agent impregnated with ball spacers having a size of 3 μm was coated to the edge of the upper plate except at a liquid crystal injection hole. Further, the alignment films formed on the upper plate and the lower plate were arranged so that they were opposite each other and alignment directions thereof were parallel to each other, and then the upper and lower plates were bonded together and the sealing agent was cured, thereby manufacturing an empty cell. In addition, the liquid crystal was injected into the empty cell, thereby manufacturing an IPS mode liquid crystal cell.

2) Measurement of Voltage Holding Ratio (VHR)

The voltage holding ratio (VHR), which is an electrical characteristic of the prepared liquid crystal alignment cell, was measured using 6254C equipment available from TOYO Corporation. The voltage holding ratio (VHR) was measured under the conditions of 1 Hz and 60° C. (VHR 60° C. and 1 Hz n-LE conditions). The measurement results of the voltage holding ratio (VHR) of the liquid crystal alignment cell are shown in Table 1 below.

3) Evaluation of Liquid Crystal Alignment Properties

Polarizing plates were adhered to the upper and lower plates of the liquid crystal cell prepared as above with their polarizing axes perpendicular to each other. The liquid crystal cell to which the polarizing plates were adhered was then placed on a backlight with brightness of 7000 cd/m², and light leakage was observed with the naked eye. At this time, if the alignment properties of the liquid crystal alignment film are excellent and the liquid crystal is arranged well, light is not passed through the upper and lower polarizing plates adhered with their polarizing axes perpendicular to each other, and it is observed dark without defects. In this case, the alignment properties are evaluated as 'good', and when light leakage such as a liquid crystal flow, mark or bright spot is observed, it is evaluated as 'poor'. The results are shown in Table 1 below.

4) Evaluation of Alignment Film Strength

For the alignment films obtained from the liquid crystal aligning agent composition prepared in the examples and comparative examples, the surface of the alignment film was rubbed while rotating the surface of the alignment film at 850 rpm using a rubbing machine (manufactured by Sindo Engineering), and then the haze value was measured using a hazemeter. The film strength was evaluated by calculating the difference between the haze value before rubbing treatment and the haze value after rubbing treatment. If the haze change value is less than 1, the film strength is excellent.

Film strength (%)=haze (%) of liquid crystal alignment film after rubbing treatment−haze (%) of liquid crystal alignment film before rubbing treatment.  [Mathematical Equation 1]

Experimental Example 2

1) Preparation of Liquid Crystal Alignment Cell

A liquid crystal alignment cell was prepared in the same manner as in Experimental Example 1, except that before firing (curing) the coating film in a hot plate at 230° C. for 30 minutes, a step of leaving the coated film on a hot plate at 130° C. for 500 seconds and subjecting it to a low-temperature heat treatment is further included.

TABLE 1

Measurement Results of Examples and Comparative Examples

| Category | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|
| Polymer | Preparation Example 2-1 Preparation Example 2-4 | Preparation Example 2-2 Preparation Example 2-4 | Preparation Example 2-3 Preparation Example 2-4 | Preparation Example 2-1 Preparation Example 2-4 | Preparation Example 2-1 Preparation Example 2-4 | Preparation Example 2-1 Preparation Example 2-4 | Preparation Example 2-1 Preparation Example 2-4 | Preparation Example 2-4 | Preparation Example 2-1 Preparation Example 2-4 |
| Epoxy additive | TGMD A | TGMD A | TGMD A | TGMD A | TGMD A | TGMD A | — | TGMD A | TGMD A |
| Polyoxazoline crosslinking agent | Chemical Formula A | Chemical Formula A | Chemical Formula A | Chemical Formula B | Chemical Formula C | — | Chemical Formula A | Chemical Formula A | Chemical Formula D |
| VHR (%) | 90 or more | 90 or more | 90 or more | 90 or more | 90 or more | 80 | 90 or more | 90 or more | 82 |
| Alignment properties | Good | Good | Good | Good | Good | Good | Good | Poor | Poor |
| Film strength (%) | 0.87 | 0.9 | 0.7 | 0.6 | 0.8 | 0.8 | 5 | 0.93 | 3 |

As shown in Table 1, the liquid crystal aligning agent composition of the examples containing the polymer synthesized in Preparation Example 2-1, an epoxy additive, and a polyoxazoline crosslinking agent exhibited a high voltage holding ratio value of 90% or more. Thus, the alignment cell produced from the liquid crystal aligning agent composition of the above examples realized excellent electrical characteristics, and simultaneously the haze value change before and after the rubbing treatment was very low, i.e., less than 1, while the film strength performance was improved.

Meanwhile, it was confirmed that the alignment film obtained from the liquid crystal aligning agent composition of Comparative Example 1 containing no polyoxazoline crosslinking agent had a voltage holding ratio of 80%, which was decreased as compared with the examples.

In addition, the alignment film obtained from the liquid crystal aligning agent composition of Comparative Example 2 containing no epoxy additive had a significantly increased haze change value before and after the rubbing treatment, indicating that the film strength was remarkably poor as compared with the examples.

Further, it was confirmed that the alignment film obtained from the liquid crystal aligning agent composition of Comparative Example 3 containing no polymer synthesized in Preparation Example 2-1 had remarkably poor alignment properties as compared with the examples.

Further, the alignment film obtained from the liquid crystal aligning agent composition of Comparative Example 4 containing a polyoxazoline crosslinking agent represented by Chemical Formula D having a different structure from the polyoxazoline crosslinking agent of the present invention represented by Chemical Formula A was not only poor in alignment properties as compared with the examples, but also exhibited a voltage holding ratio of 82%, confirming that the electrical characteristics were decreased as compared with the examples. Further, the haze change value before and after rubbing treatment was greatly increased to 3%, confirming that the film strength was remarkably poor as compared with the examples.

The invention claimed is:

1. A liquid crystal aligning agent composition comprising:
a polymer containing a polyimide or a precursor thereof; and a polyoxazoline crosslinking agent containing a repeating unit represented by Chemical Formula 1:

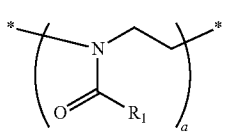

[Chemical Formula 1]

wherein, in the Chemical Formula 1,
$R_1$ is an alkyl group having 1 to 20 carbon atoms, or a heteroatom-substituted alkyl group having 1 to 20 carbon atoms, and
a is an integer of 1 to 10,000.

2. The liquid crystal aligning agent composition of claim 1, wherein the polyoxazoline crosslinking agent has, at one end thereof, at least one selected from the group of an alkyl group having 1 to 20 carbon atoms, a hydroxyl group, a thiol group, an alkynyl group, an amine group, an azide group, and a silyl group.

3. The liquid crystal aligning agent composition of claim 2, wherein the polyoxazoline crosslinking agent has, at the opposite end at least one selected from the group consisting of an alkyl group having 1 to 20 carbon atoms, a heteroatom-substituted an alkyl group having 1 to 20 carbon atoms, an alkynyl group having 2 to 20 carbon atoms, an aryl group having 6 to 20 carbon atoms, and an arylalkyl group having 6 to 30 carbon atoms.

4. The liquid crystal aligning agent composition of claim 1, wherein the polyoxazoline crosslinking agent includes a homopolymer represented by Chemical Formula 1-1:

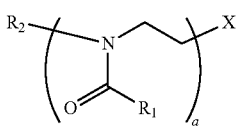

[Chemical Formula 1-1]

wherein, in the Chemical Formula 1-1,
$R_1$ is an alkyl group having 1 to 20 carbon atoms, or a heteroatom-substituted alkyl group having 1 to 20 carbon atoms,
$R_2$ is an alkyl group having 1 to 20 carbon atoms, a heteroatom-substituted alkyl group having 1 to 20 carbon atoms, an alkynyl group having 2 to 20 carbon atoms, an aryl group having 6 to 20 carbon atoms, or an arylalkyl group having 6 to 30 carbon atoms, X is an alkyl group having 1 to 20 carbon atoms, a hydroxyl group, a thiol group, an alkynyl group, an amine group, an azide group, or a silyl group, and
a is an integer of 1 to 10,000.

5. The liquid crystal aligning agent composition of claim 1, wherein the polyoxazoline crosslinking agent includes a copolymer containing two or more different repeating units represented by Chemical Formula 1.

6. The liquid crystal aligning agent composition of claim 1, wherein the polyoxazoline crosslinking agent has a weight average molecular weight of 5000 g/mol to 1,000,000 g/mol as measured by a GPC method.

7. The liquid crystal aligning agent composition of claim 1, wherein the polyoxazoline crosslinking agent is contained in an amount of 0.1 to 20% by weight based on the total weight of the liquid crystal aligning agent composition.

8. The liquid crystal aligning agent composition of claim 1, wherein the polymer includes: a first polymer for a liquid crystal aligning agent including one or more repeating units selected from the group consisting of a repeating unit represented by Chemical Formula 2, a repeating unit represented by Chemical Formula 3, and a repeating unit, represented by Chemical Formula 4; and
a second polymer for a liquid crystal aligning agent including one or more repeating units selected from the group consisting of a repeating unit represented by Chemical Formula 5, a repeating unit represented by Chemical Formula 6, and a repeating unit represented by Chemical Formula 7:

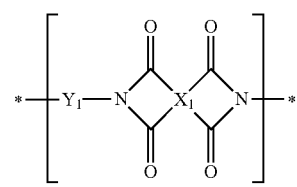

[Chemical Formula 2]

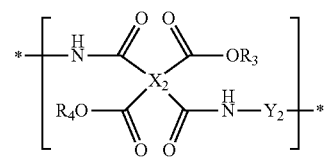

[Chemical Formula 3]

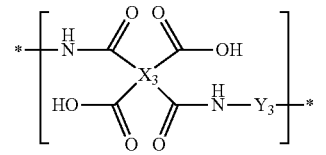

[Chemical Formula 4]

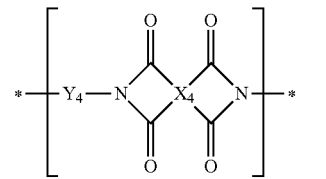

[Chemical Formula 5]

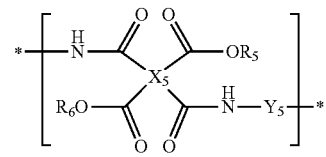

[Chemical Formula 6]

[Chemical Formula 7]

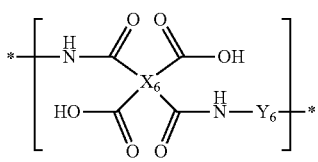

wherein, in the Chemical Formulas 2 to 7,
at least one of $R_3$ and $R_4$ is an alkyl group having 1 to 10 carbon atoms and the other is hydrogen,
at least one of $R_5$ and $R_6$ is an alkyl group having 1 to 10 carbon atoms and the other is hydrogen,
$X_1$ to $X_6$ are each independently a first tetravalent organic group represented by Chemical Formula 8,

[Chemical Formula 8]

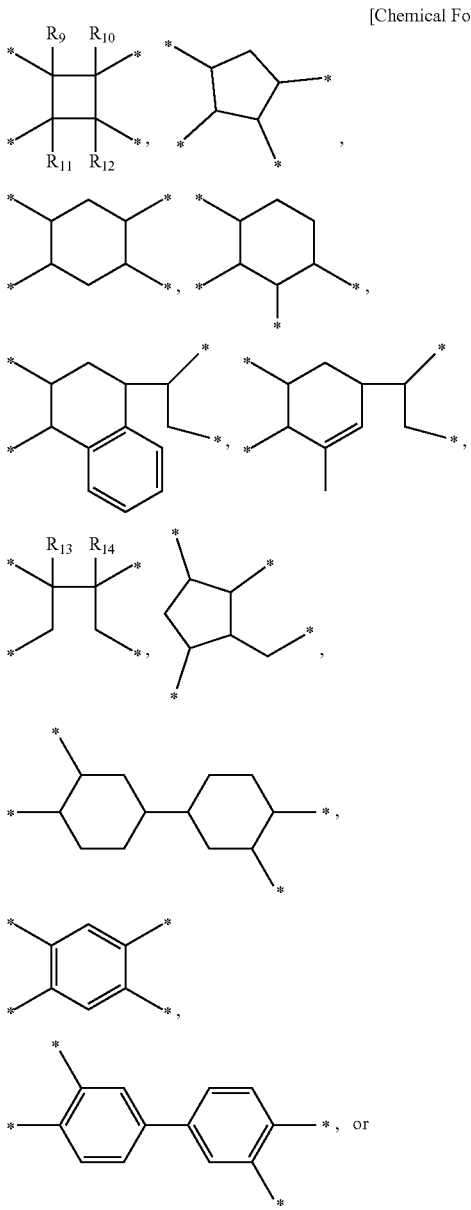

[Chemical Formula 8 continued]

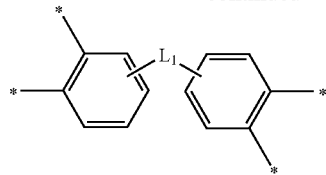

wherein, in the Chemical Formula 8, $R_9$ to $R_{14}$ are each independently hydrogen or an alkyl group having 1 to 6 carbon atoms, and
$L_1$ is any one selected from the group consisting of a single bond, —O—, —CO—, —COO—, —S—, —SO—, —SO$_2$—, —CR$_{15}$R$_{16}$—, —(CH$_2$)$_z$—, —O(CH$_2$)$_z$O—, —COO(CH$_2$)$_z$OCO—, —CONH—, phenylene, and a combination thereof,
wherein $R_{15}$ and $R_{16}$ are each independently hydrogen, an alkyl group, or a fluoroalkyl group having 1 to 10 carbon atoms,
z is an integer of 1 to 10, and
$Y_1$ to $Y_3$ are each independently a divalent organic group represented by Chemical Formula 9,

[Chemical Formula 9]

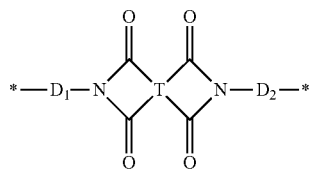

wherein, in Chemical Formula 9,
T is a second tetravalent organic group represented by Chemical Formula 8,
$D_1$ and $D_2$ are each independently an alkylene group having 1 to 20 carbon atoms, a heteroalkylene group having 1 to 10 carbon atoms, a cycloalkylene group having 3 to 20 carbon atoms, an arylene group having 6 to 20 carbon atoms, or a heteroarylene group having 2 to 20 carbon atoms, and
$Y_4$ to $Y_6$ are each independently a divalent organic group represented by Chemical Formula 10,

[Chemical Formula 10]

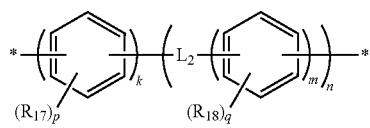

wherein, in the Chemical Formula 10,
$R_{17}$ and $R_{18}$ are each independently hydrogen, a halogen, a cyano, a nitrile, an alkyl having 1 to 10 carbon atoms, an alkenyl having 1 to 10 carbon atoms, an alkoxy having 1 to 10 carbon atoms, a fluoroalkyl having 1 to 10 carbon atoms, or a fluoroalkoxy having 1 to 10 carbon atoms,
p and q are each independently an integer of 0 to 4,
$L_2$ is a single bond, —O—, —CO—, —S—, —SO$_2$—, —C(CH$_3$)$_2$—, —C(CF$_3$)$_2$—, —CONH—, —COO—, —(CH$_2$)$_y$—, —O(CH$_2$)$_y$O—, —O(CH$_2$)$_y$—, —NH—, —NH(CH$_2$)$_y$—NH—, —NH(CH$_2$)$_y$O—, —OCH$_2$—C $(CH_3)_2$—$CH_2O$—, —COO—$(CH_2)_y$—OCO—, or —OCO—$(CH_2)_y$—COO—, y is an integer of 1 to 10, k and m are each independently an integer of 0 to 3, and n is an integer of 0 to 3.

9. The liquid crystal aligning agent composition of claim 8, wherein a weight ratio of the first polymer and the second polymer is 1:9 to 9:1.

10. The liquid crystal aligning agent composition of claim 1, further comprising a compound having two or more epoxy groups in a molecule.

11. The liquid crystal aligning agent composition of claim 10, wherein the compound having two or more epoxy groups in a molecule includes a compound represented by Chemical Formula 11:

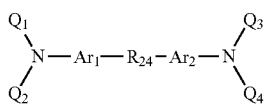

[Chemical Formula 11]

wherein, in the Chemical Formula 11, $R_{24}$ is an alkylene group having 1 to 10 carbon atoms, $Ar_1$ and $Ar_2$ are each independently an arylene group having 6 to 10 carbon atoms, and $Q_1$ to $Q_4$ are each independently hydrogen or a glycidyl group.

12. The liquid crystal aligning agent composition of claim 10, wherein the compound having two or more epoxy groups in a molecule is contained in an amount of 0.1 to 30 parts by weight based on 100 parts by weight of the total weight of the first polymer and the second polymer.

13. A method for preparing a liquid crystal alignment film comprising the steps of:

coating the liquid crystal aligning agent composition of claim 1 on a substrate to form a coating film;

drying the coating film;

alignment treatment by irradiating the coating film immediately after the drying step with light or rubbing the coating film; and heat-treating and curing the alignment-treated coating film.

14. The method for preparing a liquid crystal alignment film of claim 13, wherein the liquid crystal aligning agent composition is dissolved or dispersed in an organic solvent.

15. The method for preparing a liquid crystal alignment film of claim 13, wherein the step of drying the coating film is performed at 50° C. to 150° C.

16. The method for preparing a liquid crystal alignment film of claim 13, wherein the light in the alignment treatment step is polarized ultraviolet rays having a wavelength of 150 nm to 450 nm.

17. The method for preparing a liquid crystal alignment film of claim 13, wherein in the step of heat-treating and curing, the temperature of the heat treatment, is 150° C. to 300° C.

18. A liquid crystal alignment film comprising an aligned and cured product of the liquid crystal aligning agent composition of claim 1.

19. A liquid crystal display device comprising the liquid crystal alignment film of claim 18.

20. A liquid crystal alignment film produced by the method of claim 13.

* * * * *